US011223633B2

(12) United States Patent
Wright et al.

(10) Patent No.: US 11,223,633 B2
(45) Date of Patent: Jan. 11, 2022

(54) CHARACTERIZING UNIQUE NETWORK FLOW SESSIONS FOR NETWORK SECURITY

(71) Applicant: International Business Machines Corporation, Armonk, NY (US)

(72) Inventors: Holly Wright, Studio Village (AU); Dale Bowie, Benowa (AU)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 16/797,710

(22) Filed: Feb. 21, 2020

(65) Prior Publication Data
US 2021/0266333 A1 Aug. 26, 2021

(51) Int. Cl.
H04L 29/06 (2006.01)
(52) U.S. Cl.
CPC .................. H04L 63/1408 (2013.01)
(58) Field of Classification Search
CPC ... H04L 47/125; H04L 47/50; H04L 63/0236; H04L 63/1408
USPC .......................................................... 726/22
See application file for complete search history.

(56) References Cited

U.S. PATENT DOCUMENTS

| 9,729,439 | B2 | 8/2017 | MeLampy et al. | |
|---|---|---|---|---|
| 10,050,885 | B2* | 8/2018 | Benz | H04L 63/0236 |
| 10,277,506 | B2 | 4/2019 | Timmons et al. | |
| 10,992,652 | B2* | 4/2021 | Putatunda | H04L 67/14 |
| 2002/0091636 | A1* | 7/2002 | Carroll Bullard | H04L 43/00 705/40 |
| 2005/0234920 | A1* | 10/2005 | Rhodes | G06F 21/552 |
| 2014/0089504 | A1* | 3/2014 | Scholz | H04L 43/062 709/224 |
| 2015/0120856 | A1* | 4/2015 | Bennett | H04L 41/145 709/213 |
| 2019/0222965 | A1 | 7/2019 | O'Connor et al. | |
| 2020/0403844 | A1* | 12/2020 | Greene | H04L 41/0293 |

* cited by examiner

Primary Examiner — Binh Kien Tieu
(74) Attorney, Agent, or Firm — Jeffrey S. LaBaw; David H. Judson

(57) ABSTRACT

A technique to identify and distinguish flow sessions begins by capturing a flow record indicating an initiation of a network flow. A unique session identifier associated with the captured flow record is computed by applying a given function over data comprising a set of information (e.g., a tuple) captured in the flow record, together with a time value associated with collection interval having a start time. The given function may be a hash function. The unique session identifier is associated with one or more additional network flows captured during the collection interval, e.g., from another network flow device that computes the same identifier for at least a second flow record captured during the collection interval. In one embodiment, the flow records are captured by distinct data collectors and comprise portions of a same flow session. The distinct data collectors may utilize the same or different flow record types or protocols.

20 Claims, 4 Drawing Sheets

CHARACTERIZING UNIQUE NETWORK FLOW SESSIONS FOR NETWORK SECURITY

BACKGROUND

Technical Field

This disclosure relates generally to cybersecurity offense analytics.

Background of the Related Art

Today's networks are larger and more complex than ever before, and protecting them against malicious activity is a never-ending task. Organizations seeking to safeguard their intellectual property, protect their customer identities, avoid business disruptions, and the like, need to do more than just monitor logs and network flow data; indeed, many organizations create millions, or even billions, of events per day, and distilling that data down to a short list of priority offenses can be daunting.

Known security products include Security Incident and Event Management (SIEM) solutions, which are built upon rule-based mechanisms to evaluate observed security events. SIEM systems and methods collect, normalize and correlate available network data. One such security intelligence product of this type is IBM® QRadar® STEM, which provides a set of platform technologies that inspect network flow data to find and classify valid hosts and servers (assets) on the network, tracking the applications, protocols, services and ports they use. The product collects, stores and analyzes this data, and it performs real-time event correlation for use in threat detection and compliance reporting and auditing. Using this platform, billions of events and flows can therefore be reduced and prioritized into a handful of actionable offenses, according to their business impact.

Network transactions typically consist of a series of multiple packets between a server and client. With the prevalence of security monitoring and the use of SIEMs, many entities are choosing to collect this flow information to detect cyber-threats. With the ever-increasing amounts of traffic on the network, the need for mechanisms that allow the quick correlation of disparate records is becoming increasingly important. One such view that is useful in security operations is the ability to see what happened in a particular flow session. Current mechanisms of defining and querying for flows in a given flow session, however, typically are tightly-coupled to knowledge about which flow collector saw the traffic, which protocol was used, and which flow fields were present. For example, correlation may be required between two different network flow collectors that are seeing different halves of the same session (i.e. asymmetric routing and recombination), or a correlation may be required between a network flow collector and an event log collector. In these examples, an analyst might be able to craft a complex query that looks for matching flows from all of these sources over a given time period, but the result of such a query is not necessarily guaranteed to be accurate as there is no way to know whether the timestamps will be consistent across all sources. There are numerous potential reasons for this inconsistency, e.g., time-drift, or time differences between the receiving of related flow records at different collectors.

As a consequence, correlating information from multiple different network flow collectors is difficult and often results in increased security operations costs and complexities, as security analysts must perform complex queries to get an accurate view of what happened in the lifetime of flow session. Furthermore, these queries can be prone to error, as information from separate flow collectors and different flow types cannot necessarily be directly compared.

BRIEF SUMMARY

The technique of this disclosure addresses these and other known deficiencies in the prior art by providing a technique to correlate flow records that contribute to a flow session. According to this approach, flow records that contribute to a particular flow session are normalized and tagged by observing given information about the flow and using a time interval-based approach to identify a flow's start time. Preferably, the given information comprises a tuple comprising a set of data fields that identify the flow. The time interval preferably is associated to a flow's start time and defines a time period.

In a representative embodiment, a method to identify and distinguish flow sessions over a network begins by capturing a flow record indicative of an initiation of a network flow. A unique session identifier associated with the captured flow record is then computed. The unique session identifier is computed by applying a given function over data comprising a set of information captured in the flow record, together with a time value associated with collection interval having a start time. Preferably, the set of information captured in the flow record is a data tuple, and the given function is a hash function. The unique session identifier is associated with one or more additional network flows captured during the collection interval, e.g., from another network flow device that computes the same unique session identifier with respect to at least a second flow record also captured during the collection interval. In one embodiment, the flow record and the second flow record are captured by distinct data collectors and comprise portions of a same conversation (a flow session) between endpoints. The distinct data collectors may utilize the same or different flow record types or protocols.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

Figure 1:
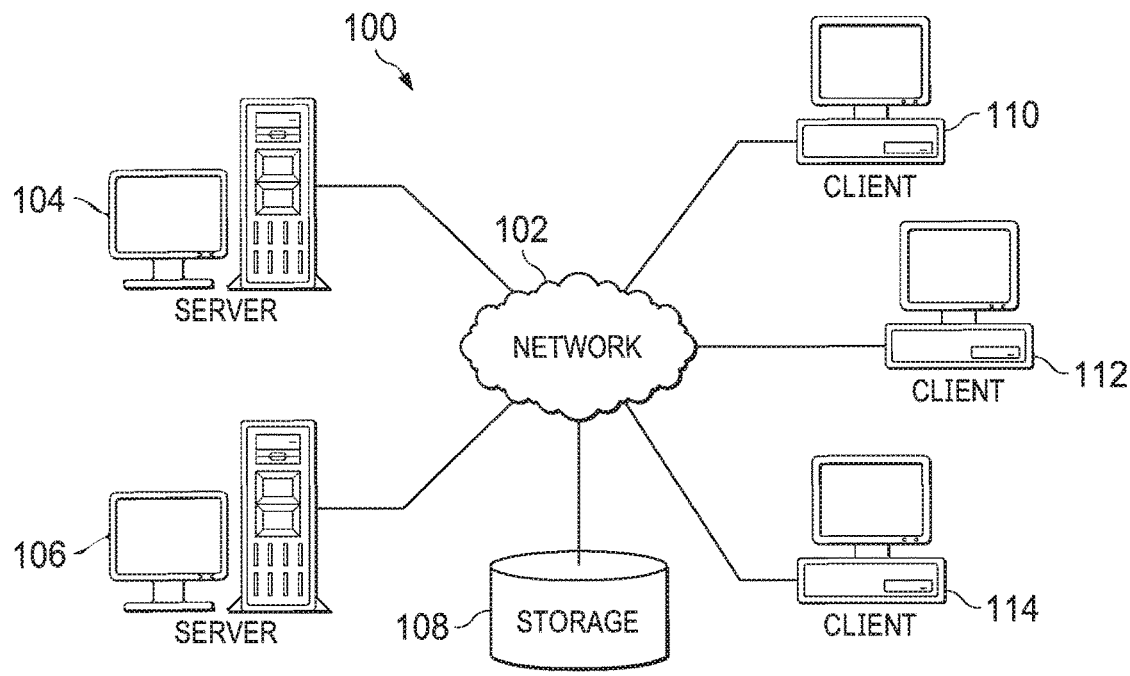
FIG. 1 depicts an exemplary block diagram of a distributed data processing environment in which exemplary aspects of the illustrative embodiments may be implemented.
Figure 2:
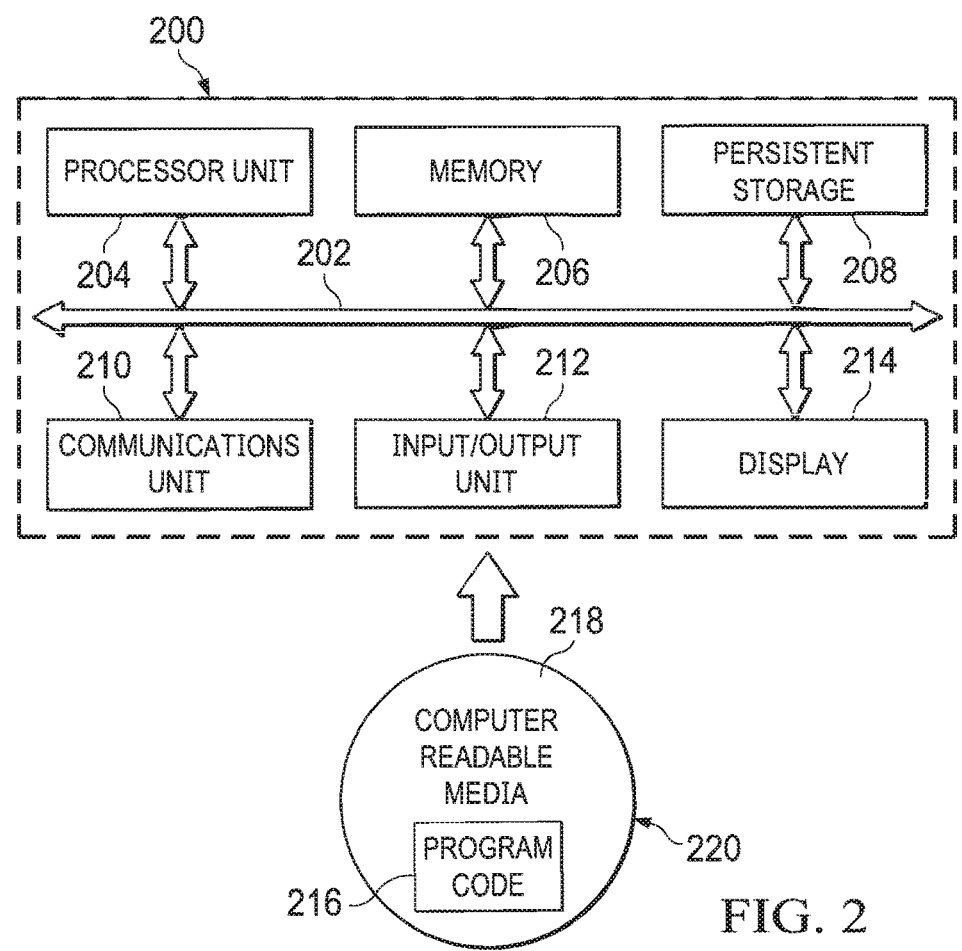
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Security Intelligence Platform with Incident Forensics

Figure 3:
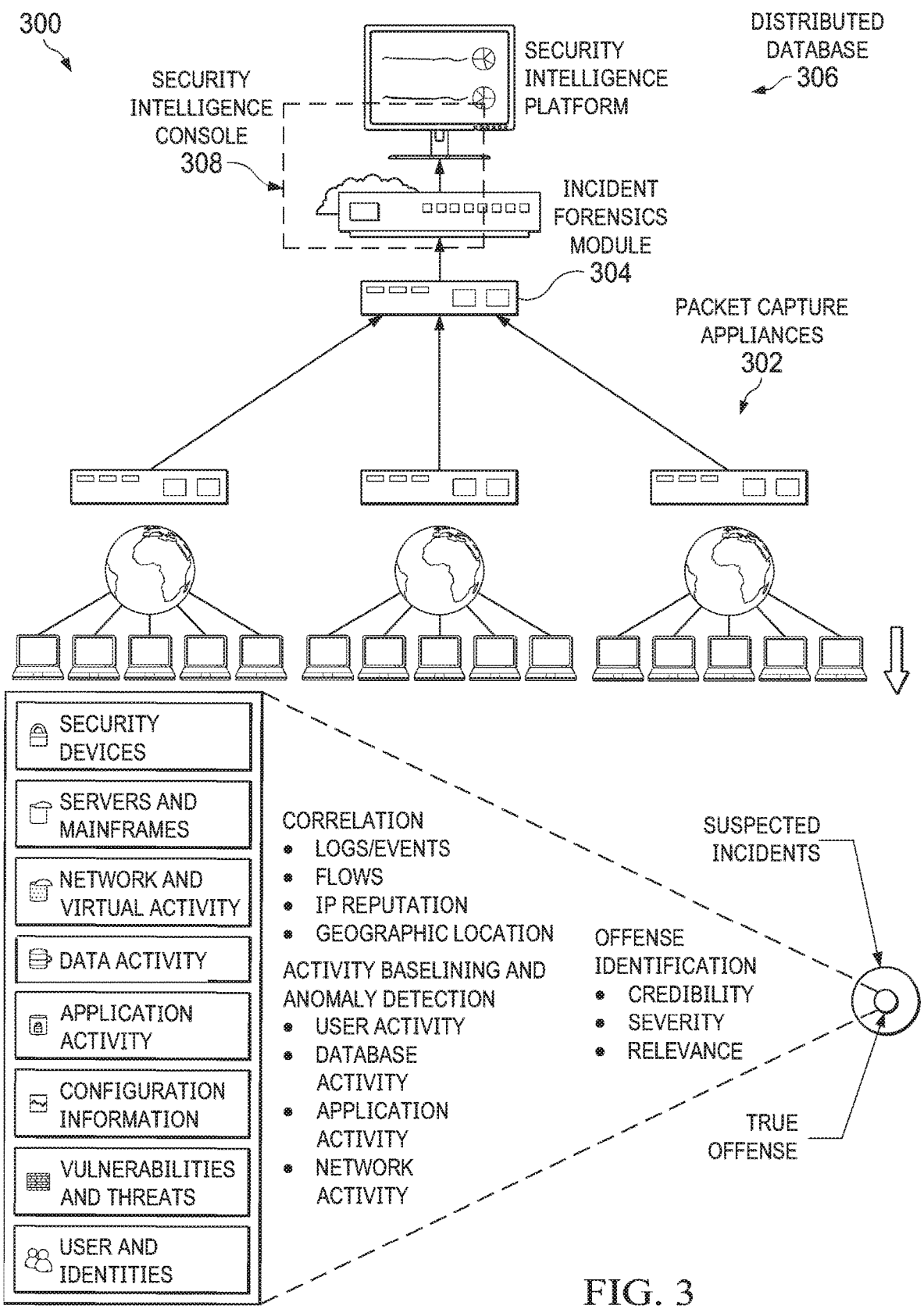
FIG. 3 illustrates a security intelligence platform in which the techniques of this disclosure may be practiced.

A known type of security intelligence platform is illustrated in FIG. 3. Generally, the platform provides search-driven data exploration, session reconstruction, and forensics intelligence to assist security incident investigations. In pertinent part, the platform 300 comprises a set of packet capture appliances 302, an incident forensics module appliance 304, a distributed database 306, and a security intelligence console 308. The packet capture and module appliances are configured as network appliances, or they may be configured as virtual appliances. The packet capture appliances 302 are operative to capture packets off the network (using known packet capture (pcap) application programming interfaces (APIs) or other known techniques), and to provide such data (e.g., real-time log event and network flow) to the distributed database 306, where the data is stored and available for analysis by the forensics module 304 and the security intelligence console 308. A packet capture appliance operates in a session-oriented manner, capturing all packets in a flow, and indexing metadata and payloads to enable fast search-driven data exploration. The database 306 provides a forensics repository, which distributed and heterogeneous data sets comprising the information collected by the packet capture appliances. The console 308 provides a web- or cloud-accessible user interface (UI) that exposes a "Forensics" dashboard tab to facilitate an incident investigation workflow by an investigator. Using the dashboard, an investigator selects a security incident. The incident forensics module 304 retrieves all the packets (including metadata, payloads, etc.) for a selected security incident and reconstructs the session for analysis.

A representative commercial product that implements an incident investigation workflow of this type is IBM® Security QRadar® Incident Forensics V7.2.3 (or higher). Using this platform, an investigator searches across the distributed and heterogeneous data sets stored in the database, and receives a unified search results list. The search results may be merged in a grid, and they can be visualized in a "digital impression" tool so that the user can explore relationships between identities.

In particular, a typical incident forensics investigation to extract relevant data from network traffic and documents in the forensic repository is now described. According to this approach, the platform enables a simple, high-level approach of searching and bookmarking many records at first, and then enables the investigator to focus on the bookmarked records to identify a final set of records. In a typical workflow, an investigator determines which material is relevant. He or she then uses that material to prove a hypothesis or "case" to develop new leads that can be followed up by using other methods in an existing case. Typically, the investigator focuses his or her investigation through course-grained actions at first, and then proceeds to fine-tune those findings into a relevant final result set. The bottom portion of FIG. 3 illustrates this basic workflow. Visualization and analysis tools in the platform may then be used to manually and automatically assess the results for relevance. The relevant records can be printed, exported, or submitted processing.

As noted above, the platform console provides a user interface to facilitate this workflow. Thus, for example, the platform provides a search results page as a default page on an interface display tab. Investigators use the search results to search for and access documents. The investigator can use other tools to further the investigation. One of these tools is a digital impression tool. A digital impression is a compiled set of associations and relationships that identify an identity trail. Digital impressions reconstruct network relationships to help reveal the identity of an attacking entity, how it communicates, and what it communicates with. Known entities or persons that are found in the network traffic and documents are automatically tagged. The forensics incident module 304 is operative to correlate tagged identifiers that interacted with each other to produce a digital impression. The collection relationships in a digital impression report represent a continuously-collected electronic presence that is associated with an attacker, or a network-related entity, or any digital impression metadata term. Using the tool, investigators can click any tagged digital impression identifier that is associated with a document. The resulting digital impression report is then listed in tabular format and is organized by identifier type.

Generalizing, a digital impression reconstructs network relationships to help the investigator identify an attacking entity and other entities that it communicates with. A security intelligence platform includes a forensics incident module that is operative to correlate tagged identifiers that interacted with each other to produce a digital impression. The collection relationships in a digital impression report represent a continuously-collected electronic presence that is associated with an attacker, or a network-related entity, or any digital impression metadata term. Using the tool, investigators can click any tagged digital impression identifier that is associated with a document. The resulting digital impression report is then listed in tabular format and is organized by identifier type.

Typically, an appliance for use in the above-described system is implemented is implemented as a network-connected, non-display device. For example, appliances built purposely for performing traditional middleware service oriented architecture (SOA) functions are prevalent across certain computer environments. SOA middleware appliances may simplify, help secure or accelerate XML and Web services deployments while extending an existing SOA infrastructure across an enterprise. The utilization of middleware-purposed hardware and a lightweight middleware stack can address the performance burden experienced by conventional software solutions. In addition, the appliance form-factor provides a secure, consumable packaging for implementing middleware SOA functions. One particular advantage that these types of devices provide is to offload processing from back-end systems. A network appliance of this type typically is a rack-mounted device. The device includes physical security that enables the appliance to serve as a secure vault for sensitive information. Typically, the appliance is manufactured, pre-loaded with software, and then deployed within or in association with an enterprise or other network operating environment; alternatively, the box may be positioned locally and then provisioned with standard or customized middleware virtual images that can be securely deployed and managed, e.g., within a private or an on premise cloud computing environment. The appliance may include hardware and firmware cryptographic support, possibly to encrypt data on hard disk. No users, including administrative users, can access any data on physical disk. In particular, preferably the operating system (e.g., Linux) locks down the root account and does not provide a command shell, and the user does not have file system access. Typically, the appliance does not include a display device, a CD or other optical drive, or any USB, Firewire or other ports to enable devices to be connected thereto. It is designed to be a sealed and secure environment with limited accessibility and then only be authenticated and authorized individuals.

An appliance of this type can facilitate Security Information Event Management (SIEM). For example, IBM® Security QRadar® SIEM is an enterprise solution that includes packet data capture appliances that may be configured as appliances of this type. Such a device is operative, for example, to capture real-time Layer 4 network flow data from which Layer 7 application payloads may then be analyzed, e.g., using deep packet inspection and other technologies. It provides situational awareness and compliance support using a combination of flow-based network knowledge, security event correlation, and asset-based vulnerability assessment. In a basic QRadar STEM installation, the system such as shown in FIG. 3 is configured to collect event and flow data, and generate reports. As noted, a user (e.g., an SOC analyst) can investigate offenses to determine the root cause of a network issue.

Generalizing, Security Information and Event Management (SIEM) tools provide a range of services for analyzing, managing, monitoring, and reporting on IT security events and vulnerabilities. Such services typically include collection of events regarding monitored accesses and unexpected occurrences across the data network, and analyzing them in a correlative context to determine their contribution to profiled higher-order security events. They may also include analysis of firewall configurations, network topology and connection visualization tools for viewing current and potential network traffic patterns, correlation of asset vulnerabilities with network configuration and traffic to identify active attack paths and high-risk assets, and support of policy compliance monitoring of network traffic, topology and vulnerability exposures. Some SIEM tools have the ability to build up a topology of managed network devices such as routers, firewalls, and switches based on a transformational analysis of device configurations processed through a common network information model. The result is a locational organization which can be used for simulations of security threats, operational analyses of firewall filters, and other applications. The primary device criteria, however, are entirely network- and network-configuration based. While there are a number of ways to launch a discovery capability for managed assets/systems, and while containment in the user interface is semi-automatically managed (that is, an approach through the user interface that allows for semi-automated, human-input-based placements with the topology, and its display and formatting, being data-driven based upon the discovery of both initial configurations and changes/deletions in the underlying network), nothing is provided in terms of placement analytics that produce fully-automated placement analyses and suggestions.

Thus, in the approach, details of an offense are extracted from a STEM system, such as QRadar. The details typically include offense types, rules, categories, source and destination IP addresses, and user names. For example, an offense may be a malware category offense that indicates that malicious software is detected on a machine. Accordingly, activities of the machine around the offense need to be examined to determine infection vectors and potential data leakage. Of course, the nature of the activities that will need to be investigated will depend on the nature of the offense.

Figure 4:
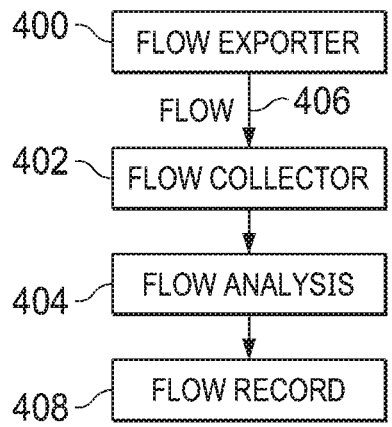
FIG. 4 depicts a network flow data collection system in which the technique of this disclosure may be implemented.

There are many different types of network flow collectors, and often collectors are specific to a particular network flow protocol. An example is NetFlow, which is a router-based feature that provides the ability to collect Internet Protocol (IP) network traffic as it enters or exits a router interface. By analyzing NetFlow data, a network administrator can identify source and destination of traffic, class of service, and causes of congestion. As depicted in FIG. 4, a typical flow monitoring setup using NetFlow comprises a flow exporter 400, which aggregates packets in to flows and exports flow records toward one or more collectors, a flow collector 402, which receives, stores and pre-processes the flow data received from a flow exporter, and an analysis application 404, which analyzes received flow data, e.g., for intrusion detection or traffic profiling. In NetFlow, a flow 406 is defined as a unidirectional sequence of packets that all share the following values: ingress interface, source IP address, destination IP address, IP protocol, source port for UDP/TCP (0 for other protocols), destination port for UDP/TCP (or type and code for ICMP, or 0 for other protocols), and type of service. As depicted in FIG. 4, a NetFlow data record 408 can contain a wide variety of information about the traffic in a given flow, e.g., input interface index used by SNMP, output interface index (or zero if the packet is dropped), timestamps for the flow start and finish time (typically in milliseconds since a last boot), number of bytes and packets observed in the flow, Layer 3 headers (source and destination IP addresses, ICMP type and code, IP protocol, Type of Service (ToS) value), source and destination port numbers for TCP, UDP, SCTP, for TCP flows, a union of all TCP flags observed over the life of the flow, Layer 3 routing information (e.g., IP address of an immediate next-hop along a route to the destination), and source and destination IP masks (prefix lengths in the CIDR notation).

There are many other types of network flow export protocols and associated collector mechanisms. Another example is sFlow (short for "sampled flow"), which is an industry standard for packet export at OSI Layer 2. It provides a means for exporting truncated packets, together with interface counters for the purpose of network monitoring. Other examples include IPFIX. Each of the flow export protocols produces flow records. As will now be described, the technique of this disclosure works with any network flow export protocol irrespective of the nature and semantics of the flow records generated.

Characterizing a Unique Flow Session

With the above as background, the technique of this disclosure provides for a way to correlate all flow records that contribute to a single flow session and, in particular, to generate a unique session identifier for the flow that is then used for characterization of a flow session. In a preferred approach, flow records that contribute to a flow are tagged by observing a tuple of the flow and using a time interval-based approach to identify a flow's start time. The unique identifier is generated when a new flow session begins, and preferably any subsequent updates to the flow session are then tagged with the same unique identifier. The unique identifier is shared amongst multiple data collection points, e.g., through sharing of tuple-to-identifier mapping, or through time-synchronization of the collection points (if they are disconnected from one another, time-wise).

Preferably, the unique flow session identifier is generated by applying a given function (e.g., a hash function) of a flow tuple, where the flow tuple comprising a set of data fields (e.g., source IP, destination IP, source port, destination port, protocol, VLAN, VXLAN, etc.) that characterize a flow, together with an indication of when a first flow record was received; the first flow record has a collection interval timestamp corresponding to when the first packet is received for a particular flow session. In one embodiment, this indication is a firstPacketIntervalTime, which then denotes a collection interval whose associated timestamp is then used in the creation of the session identifier. As will be described, this approach enables distinct, time-synchronized collectors to be able to generate the same session identifier for two halves (or, more generally, separate portions) of a conversation with respect to a transaction (within or across a flow session) that begins within the same collection interval.

Generalizing, a flow session comprises one or more flow records, where each flow record has the same unique identifier. A flow session begins when the first flow record is observed, and it ends when the transaction finishes. There are many ways to detect the completion of a transaction, however, not all protocols explicitly flag the end of a session. For example, in TCP sessions it is possible to watch for the transmittal of a 4-way termination handshake, whereas in UDP there is no such notification. In the cases where there are no indicators of session end, timeouts of session inactivity are used as an alternative.

Figure 5:
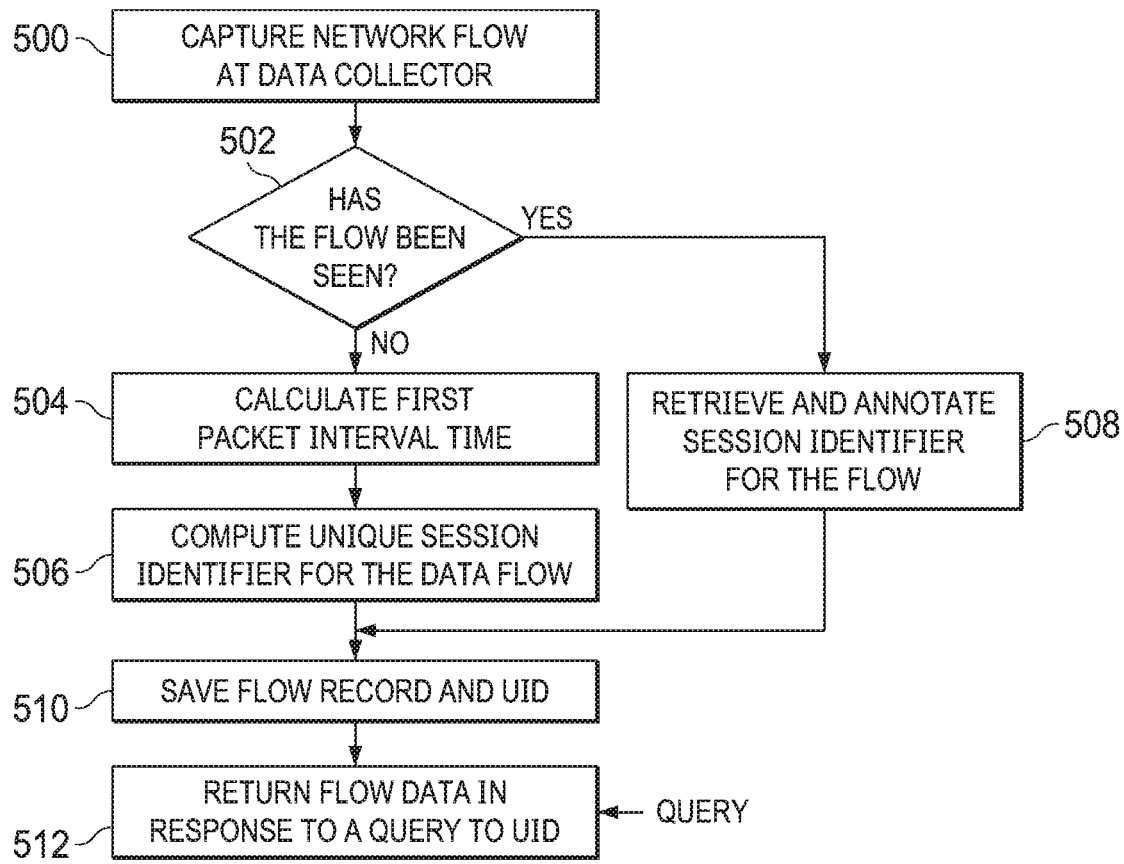
FIG. 5 depicts a process flow of the network flow characterization technique of this disclosure.

FIG. 5 depicts a process flow for the technique of this disclosure. This process flow typically occurs in parallel (concurrently) on two or more disconnected collection points and distinct data types. It begins at step 500 with a network flow record being captured by a collection engine. At step 502, a test is performed to determine if characteristics for the flow are not already present, e.g., in an active session map. An active session map typically is an in-memory data structure representing one or more data flows (and their associated flow information) captured for a particular flow session. Typically, a flow session is associated with one or more endpoint machines, devices, applications, processes or the like. If the characteristics for the flow are not already present in the active session map, the routine continues at step 504 to calculate a firstPacketIntervalTime as described further below. At step 506, the unique session identifier is then calculated/computed, e.g., by combining (concatenating) the firstPacketIntervalTime value with the tuple of the flow, with the result (typically a concatenation of data values) then being applied to a hashing function.

Optionally, the hashing function is a cryptographic hash, such as MD5. The given function is not required to be cryptographic; thus, e.g., a simple CRC (cyclic redundancy code) may be computed instead. Additional information (e.g., a salt) may also be included with the concatenated tuple and time collection interval prior to (or even after) applying the hash.

Step 506 thus results in a unique representation of the information for the session flow. This single representation is the unique session identifier (UID). If the characteristics for the flow, however, are already present in the active session map, the routine branches to step 508, wherein the session identifier is retrieved and annotated on the current network flow record being processed. This would be the situation if the collector (or some other collector) has already seen a flow within the collection interval that hashes to the same UID. At step 510, the network flow record and its associated UID are then saved in a data store. At step 512, individual network flow records are grouped together (e.g., by querying the records and their identifiers) based on their session identifier. As noted above, the above-described technique typically occurs in parallel (concurrently) on disconnected (but time-synchronized) collection points, irrespective of differences in their data types. Querying performed across a centralized data store, or across multiple data stores, returns the common (shared) session identifier and all data flows associated therewith, even when the particular data flows originate from disconnected or otherwise disparate data collectors, types or protocols. This completes the process.

Figure 6:
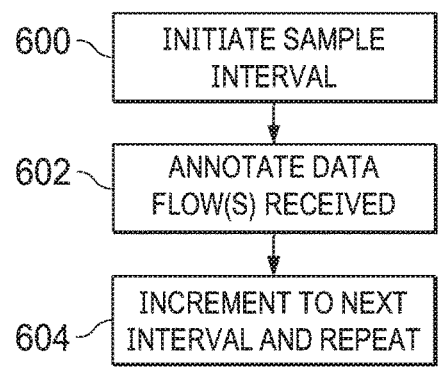
FIG. 6 depicts a process flow for a collection interval sub-process in FIG. 5.

FIG. 6 depicts a process flow for computing the firstPacketIntervalTime in one non-limiting embodiment. The routine begins at step 600. Given a sample interval size (e.g., 60 seconds), an interval is initiated (e.g., on receipt of a 0 second marker). At step 602, any flow received during that interval period (0-60 seconds) is annotated with the interval start time. At step 604, and at the completion of the 60 second window, an interval time is progressed one 60 second period, and the process repeats.

Figure 7:
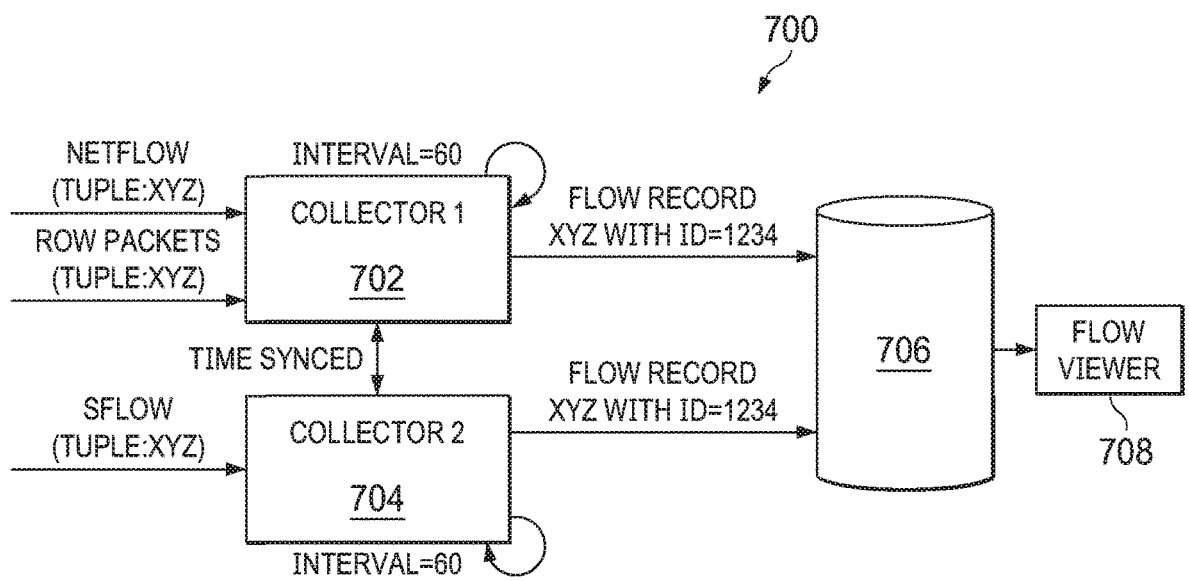
FIG. 7 depicts a pair of disparate data collectors that generate the same unique session identifier for distinct portions of a conversation associated with a flow session.

FIG. 7 depicts a representative implementation, which may be implemented within the SIEM system depicted in FIG. 3 and described above. The system 700 shown comprises first and second collectors 702 and 704. Collectors 702 and 704 are time-synchronized, but otherwise distinct in that they may be of different types, or operate using different export flow types or protocols. In this example embodiment, collector 702 receives NetFlow data comprising raw data packets, and having an associated tuple of data fields {XYZ}. In this example, this data flow is assumed to represent a first portion of the conversation between endpoints (not shown). Collector 704 receives sFlow data (a different network flow export protocol) comprising raw data packets, and having an associated tuple of data fields, namely, {XYZ}; this data flow is assumed to represent a second portion of the conversation between the endpoints. In this example, each collector is configured to operate on a 60 second interval size. As described above, each collector then calculates the session identifier using the time interval (60 seconds) and the tuple {XYZ}. As a result, and in this example, each collector generates a flow record for tuple {XYZ} with a computed session identifier (ID)=1234 (which is merely an example), and thus the records may then be correlated to establish that the disparate flows comprise part of the same session. The information generated is stored in database 706, which is query-able by a flow viewer subsystem 708. Using the flow viewer, a security analyst (or other person or entity) can view the entire flow session by simply querying for ID=1234. In response, the flow viewer queries the database 706 and retrieves the relevant data flow records. In this manner, the distinct collectors 702 and 704 generate the same session identifier to two halves of the conversation (given that, in this example, the transaction begins with the same interval). If during this flow any subsequent updates to this flow session occur, they are also tagged with the same unique identifier. As previously noted, the unique session identifier may also be shared with other disconnected collection points such that the session identifier is available as a universal flow identifier for the flow session irrespective of the particular data collector, data type or protocol configured in any flow monitoring device or system through which the traffic flows.

According to this disclosure, a flow session comprises or more flow records, where each flow record has the same unique identifier. Over time, a single tuple identifier may lose its uniqueness. For example, a single client may reuse ports when accessing the same services in the future. As such, a need exists for a method to uniquely distinguish one flow session from another, over long periods of time, and that does not just rely on the tuple for a particular client and application remaining the same.

Without intending to be limiting, the approach herein may be used in association with other network flow monitoring and analysis techniques. The network flow devices may be on-premises, network-based or cloud-based.

The technique herein provides significant advantages. It enables multiple flow records to be reconstructed into a session view, all without complex queries. It provides a technique to correlate flow information but without complex logic about mappings of IP addresses to network addresses, or knowledge about the network's control and data planes. The technique herein provides for a single universal identifier that can be used to stitch together flow records, thereby enabling correlation of all data flows (flow records) that contribute to a flow session, and the technique is agnostic to flow collector, flow record type or protocol the traffic was seen on. As has been described, the approach herein, which provides for a normalized method of tagging all flow records that contribute to a single flow session by observing the tuple of the flow and using a time interval-based approach to identify a flow's start time, overcomes the deficiencies of current data logging/analysis mechanisms that are currently tightly-coupled to knowledge about the flow collector itself.

This subject matter may be implemented as-a-service. The subject matter also may be implemented within or in association with a data center that provides cloud-based computing, data storage or related services in association with other network security products and services. The collector functionality may be provided as a standalone function, or it may leverage functionality from other products and services including, without limitation, any other security monitoring and analysis system, products, device, program or process.

In a typical use case, a SIEM or other security system has associated therewith an interface that can be used to render the data flow information visually, to search and retrieve relevant information from an alert or other database, and to perform other known input and output functions with respect thereto.

As noted above, the approach herein is designed to be implemented in an automated manner within or in association with a security system, such as a SIEM.

The functionality described in this disclosure may be implemented in whole or in part as a standalone approach, e.g., a software-based function executed by a hardware processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the threat disposition and modeling techniques are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, e.g., security incident and event management (SIEM) systems, other security systems, as well as improvements to automation-based cyber-security analytics.

Having described the invention, what we claim is as follows:

1. A method to identify and distinguish flow sessions over a network, comprising:
   capturing a flow record indicative of an initiation of a network flow;
   computing a unique session identifier associated with the captured flow record, the unique session identifier being computed by applying a given function over data comprising a set of information captured in the flow record, together with a time value associated with a collection interval having a start time; and
   associating the unique session identifier with one or more additional network flows captured during the collection interval.

2. The method as described in claim 1 wherein the unique session identifier is generated by applying a hashing function to (i) information in a set of data fields in the flow record, and (ii) a collection interval timestamp.

3. The method as described in claim 2 wherein the set of data fields is a tuple.

4. The method as described in claim 1 further including associating the unique session identifier with at least a second flow record captured during the collection interval, the at least one other flow record having been computed by applying the given function over data comprising the set of information captured in the second flow record, together with the time value.

5. The method as described in claim 4 wherein the flow record and the second flow record are captured by distinct data collectors and comprise portions of a same conversation between endpoints captured by the distinct data collectors.

6. The method as described in claim 1 wherein the distinct data collectors utilize different flow record types or protocols.

7. The method as described claim 5 wherein the distinct data collectors are time-synchronized.

8. An apparatus, comprising:
   a processor;

computer memory holding computer program instructions executed by the processor to identify and distinguish flow sessions over a network, the computer program instructions including program code configured to:
- capture a flow record indicative of an initiation of a network flow;
- compute a unique session identifier associated with the captured flow record, the unique session identifier being computed by applying a given function over data comprising a set of information captured in the flow record, together with a time value associated with a collection interval having a start time; and
- associate the unique session identifier with one or more additional network flows captured during the collection interval.

9. The apparatus as described in claim 8 wherein the computer program instructions generate the unique session identifier by computer program instructions further executed by the data processing system to apply a hashing function to (i) information in a set of data fields in the flow record, and (ii) a collection interval timestamp.

10. The apparatus as described in claim 9 wherein the set of data fields is a tuple.

11. The apparatus as described in claim 8 wherein the computer program instructions are further executed by the data processing system to associate the unique session identifier with at least a second flow record captured during the collection interval, the at least one other flow record having been computed by applying the given function over data comprising the set of information captured in the second flow record, together with the time value.

12. The apparatus as described in claim 11 wherein the flow record and the second flow record are captured by distinct data collectors and comprise portions of a same conversation between endpoints captured by the distinct data collectors.

13. The apparatus as described in claim 8 wherein the distinct data collectors utilize different flow record types or protocols.

14. The apparatus as described claim 12 wherein the distinct data collectors are time-synchronized.

15. A computer program product in a non-transitory computer readable medium for use in a data processing system to identify and distinguish flow sessions over a network, the computer program product holding computer program instructions that, when executed by the data processing system, are configured to:
- capture a flow record indicative of an initiation of a network flow;
- compute a unique session identifier associated with the captured flow record, the unique session identifier being computed by applying a given function over data comprising a set of information captured in the flow record, together with a time value associated with a collection interval having a start time; and
- associate the unique session identifier with one or more additional network flows captured during the collection interval.

16. The computer program product as described in claim 15 wherein the computer program instructions generate the unique session identifier by computer program instructions further executed by the data processing system to apply a hashing function to (i) information in a set of data fields in the flow record, and (ii) a collection interval timestamp.

17. The computer program product as described in claim 16 wherein the set of data fields is a tuple.

18. The computer program product as described in claim 15 wherein the computer program instructions are further executed by the data processing system to associate the unique session identifier with at least a second flow record captured during the collection interval, the at least one other flow record having been computed by applying the given function over data comprising the set of information captured in the second flow record, together with the time value.

19. The computer program product as described in claim 18 wherein the flow record and the second flow record are captured by distinct data collectors and comprise portions of a same conversation between endpoints captured by the distinct data collectors.

20. The computer program product as described in claim 15 wherein the distinct data collectors utilize different flow record types or protocols.

* * * * *